United States Patent [19]

Reasoner et al.

[11] Patent Number: 5,752,414
[45] Date of Patent: May 19, 1998

[54] CABLE OPERATED BRAKE/IGNITION/ TRANSMISSION INTERLOCK

[75] Inventors: Michael Reasoner, Ortonville; John W. Harrison, Goodrich, both of Mich.

[73] Assignee: Teleflex Incorporated, Plymouth Meeting, Pa.

[21] Appl. No.: 653,500

[22] Filed: May 24, 1996

[51] Int. Cl.$^6$ ............................................. G05G 11/00
[52] U.S. Cl. ......................... 74/483 R; 74/483 K; 477/96
[58] Field of Search ........................... 74/483 R, 483 K; 477/96, 99; 192/4 A

[56] References Cited

U.S. PATENT DOCUMENTS

| | | |
|---|---|---|
| 4,683,774 | 8/1987 | Memmola. |
| 4,724,722 | 2/1988 | Beauch et al. ............. 477/99 |
| 4,802,378 | 2/1989 | Memmola. |
| 4,936,431 | 6/1990 | Shinpo ..................... 192/4 A |
| 4,986,399 | 1/1991 | Gokee ...................... 192/4 A |
| 5,031,737 | 7/1991 | Dzioba et al. ............ 74/483 R X |
| 5,058,462 | 10/1991 | Killiany et al. .......... 192/4 A X |
| 5,080,434 | 1/1992 | Locher. |
| 5,211,271 | 5/1993 | Osborn et al. ............ 477/96 X |
| 5,218,847 | 6/1993 | Dieden et al. ............ 477/99 X |
| 5,511,641 | 4/1996 | Snell et al. ............... 477/96 X |
| 5,588,514 | 12/1996 | Snell ...................... 74/483 R X |

*Primary Examiner*—Khoi Q. Ta
*Assistant Examiner*—Peter T. Kwon
*Attorney, Agent, or Firm*—Howard & Howard

[57] ABSTRACT

A cable operated interlock system between the gear selector lever (12) of an automatic transmission and the brake pedal (42) restrains the gear selector lever (12) in the Park position until the brake pedal (42) is first depressed. The interlock system includes a shifter cable (68) having one end (70) connected to an L-shaped pedal actuator (62) and another end (72) connected to an inhibitor pin (74) adjacent the gear selector lever (12). A compressible tip (82) is telescopically received over the end of the pedal actuator (62), with a spring (84) trapped therebetween for yielding when the brake pedal (42) returns to its rest position in the event the gear selector lever (12) resides in one of its drive positions. The interlock system may also include an ignition cable (90) extending between an ignition switch (52) of the automobile and the pedal actuator (62). The ignition cable (90) prevents displacement of the pedal actuator (62) and the attached shifter cable (68) unless the ignition switch (52) is in a Run position. Conversely, the ignition cable (90) will not permit the ignition switch (52) to return to its Off position until the gear selector lever (12) has been placed in its Park position.

15 Claims, 3 Drawing Sheets

– 1 –
CABLE OPERATED BRAKE/IGNITION/ TRANSMISSION INTERLOCK

TECHNICAL FIELD

In an automobile, a cable operated interlock system between the gear selector lever of an automatic transmission and the brake pedal restrains the gear selector lever in the Park position until the brake pedal is first depressed.

BACKGROUND OF THE INVENTION

It is possible that an automobile equipped with an automatic transmission may suddenly and unexpectedly lurch forward or backward if the transmission is engaged into a drive gear while the engine is running, particularly if the operator has not depressed the brake pedal. This phenomenon is particularly dangerous if the engine RPM's are elevated, such as during a fast idle condition typical of start-up in cold weather. High engine RPM can also occur whenever the driver's foot accidentally depresses the accelerator pedal instead of the brake pedal, a condition more common in compact autos where the brake pedal is small and situated very near to the accelerator pedal.

To alleviate this potentially harmful situation, the prior art has taught to equip an automobile with an interlock assembly to prevent movement of the gear selector lever from its Park position until the brake pedal has been depressed a sufficient distance to pressurize the brake system and hold the automobile in a safely stopped condition upon engagement of the transmission into a drive gear. These prior art systems include purely mechanical arrangements, such as shown in U.S. Pat. No. 5,058,462 to Killiany et al., issued Oct. 22, 1991 and assigned to the assignee of the subject invention, purely electrical arrangements, and hybrid electro-mechanical arrangements. While for the most part the prior art systems perform satisfactorily, there is nevertheless opportunity to condense the packaging to provide additional room under the dashboard in the passenger compartment, and to reduce weight and fabrication costs.

SUMMARY OF THE INVENTION AND ADVANTAGES

A cable operated brake/transmission interlock assembly for an automobile having a braking system and an automatic transmission includes a gear selector lever moveable between a Park position and a plurality of drive positions for remotely controlling an automatic transmission of an automobile. A brake pedal is moveable between rest and applied positions for remotely controlling a braking system of the automobile. An interlock initially restrains the gear selector lever in the Park position until the brake pedal is moved to the applied position. The interlock including a pedal actuator reciprocally responsive to movements of the brake pedal. The interlock also includes a flexible motion transmitting shifter cable extending between opposite ends. One of the ends of the shifter cable is operatively connected to the pedal actuator and the other the end of the shifter cable is operatively engagable with the gear selector lever.

The improvement of the subject invention resides in the pedal actuator including a compressible tip for yielding in response to a force applied by the brake pedal returning to its rest position in the event the pedal actuator remains stationary due to the gear selector lever residing in the Park position. This feature allows the interlock to be packaged in a very compact unit area in the passenger compartment under the dashboard. Therefore, the available mounting and positioning opportunities for the interlock are increased. Also, the compact interlock arrangement permits other adjacent components to be more freely located in the passenger compartment under the dashboard. Further, a significant weight reduction and materials savings can be realized considering the high volumes typically associated with automotive products.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals refer to like or corresponding parts throughout the several views, a cable operated brake/ignition/transmission interlock assembly is generally indicated at 10. The cable operated brake/ transmission interlock assembly 10 is of the type for use in an automobile having a braking system and an ignition system and an automatic transmission.

Figure 1:
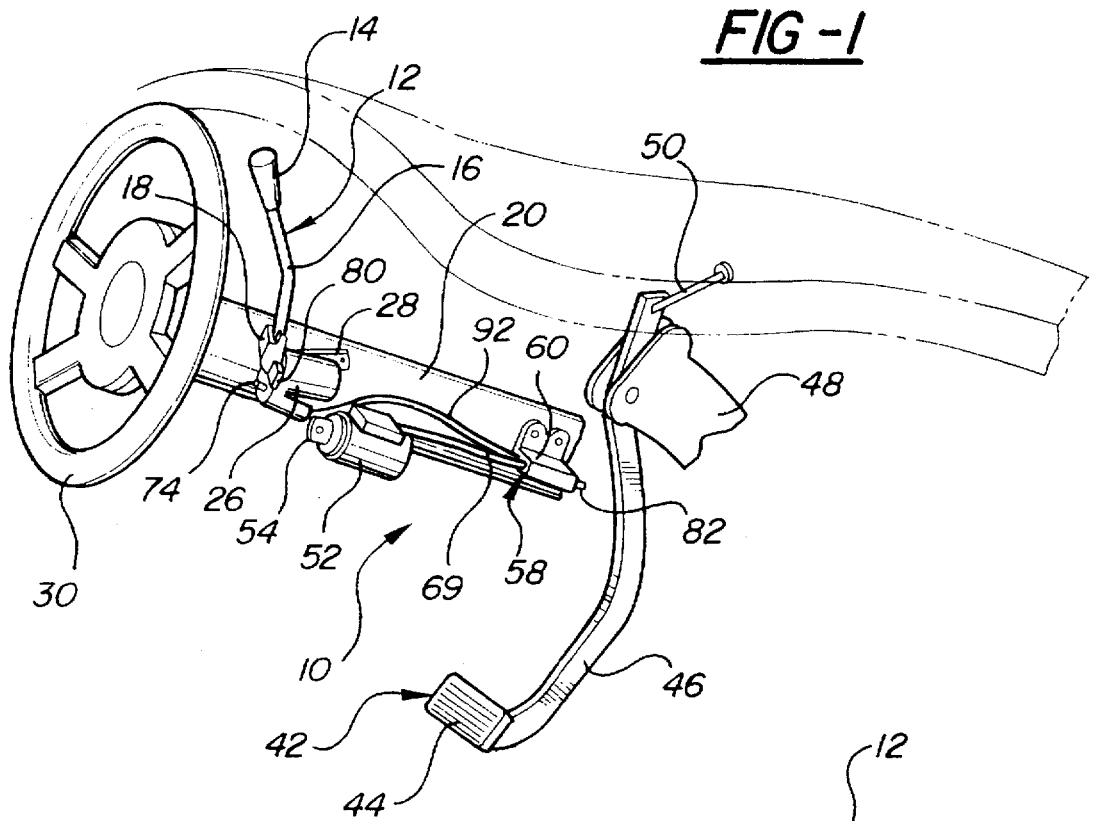
FIG. 1 is a simplified view of the subject interlock assembly disposed for operating in the passenger compartment of an automobile.
Figure 2:
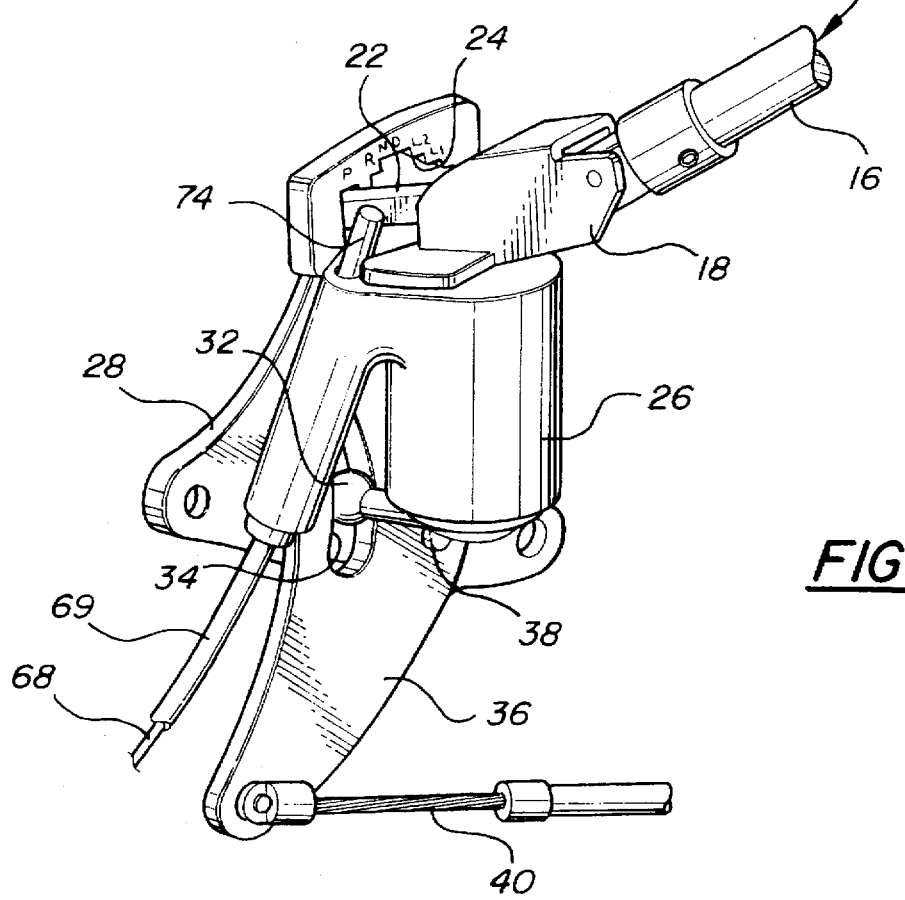
FIG. 2 is a simplified perspective view of the column shift mechanism and inhibitor pin according to the subject invention.

While the automatic transmission is not shown in the Figures, a gear selector lever 12 is illustrated which is provided for remotely controlling the automatic transmission of the automobile. The gear selector lever 12 is moveable between a Park position and a plurality of drive positions, such as Reverse, Drive and other forward selections. While in the preferred embodiment the gear selector lever 12 is of the column shift type, those skilled in the art will readily appreciate that it could alternatively be of the console shift type without departing from the spirit of the invention. As Shown in FIGS. 1 and 2, the gear selector lever 12 includes a handle 14 and a stem portion 16. The stein 16 is pivotally mounted within a yoke 18 supported on or adjacent the steering column 20. The base of the stem 16 is provided with a nose 22 which rocks back and forth in the yoke 18 as the gear selector lever 12 is pulled by a driver, and sweeps a circular (clockwise) path as the gear selector lever 12 is moved between its various Park and drive positions, as defined by a notch plate 24. The yoke 18 is integrally connected to a pivot shaft (not shown) which is rotatably supported in a shifter housing 26 which, in turn, is preferably fixed relative to the steering column 20 by a bracket 28. A steering wheel 30 is shown extending from the steering column 20 in FIG. 1.

The yoke 18 rotates a short ball driver 32 connected to the end of the pivot shaft below the shifter housing 26. The ball driver 32 rides in an arcuate cam slot 34 in a bell crank 36, which is pivotally connected to the bracket 28 at a pivot pin 38. Therefore, as the yoke 18 is rotated in the shifter housing 26 during manipulation of the gear selector lever 12 between the various Park and drive positions, the bell crank 36 is rocked back and forth about its pivot pin 38. This causes displacement of an attached transmission cable 40 which extends directly to the transmission (not shown).

The braking system of the automobile includes the typical hydraulically actuated braking elements (not shown) at each of the wheels (not shown) of the vehicle. A foot operated brake pedal, generally indicated at 42 in the Figures, is disposed inside the passenger compartment of the vehicle for remotely controlling the braking elements. The brake pedal 42 includes a foot pad 44 and a pedal arm 46 which is pivotally supported in a firewall bracket 48. Upon application of force by an operator's foot, the brake pedal 42 swings in an arc between rest and applied positions. In the rest position, the hydraulic braking system is unpressurized and unactuated; in the applied position, the hydraulic braking system is pressurized and actuated to bring the automobile to a stop. As will be readily appreciated by those skilled in the art, the upper end of the pedal arm 46 is operatively connected to a master cylinder link 50, which extends through the firewall to the master cylinder (not shown).

Figure 3:
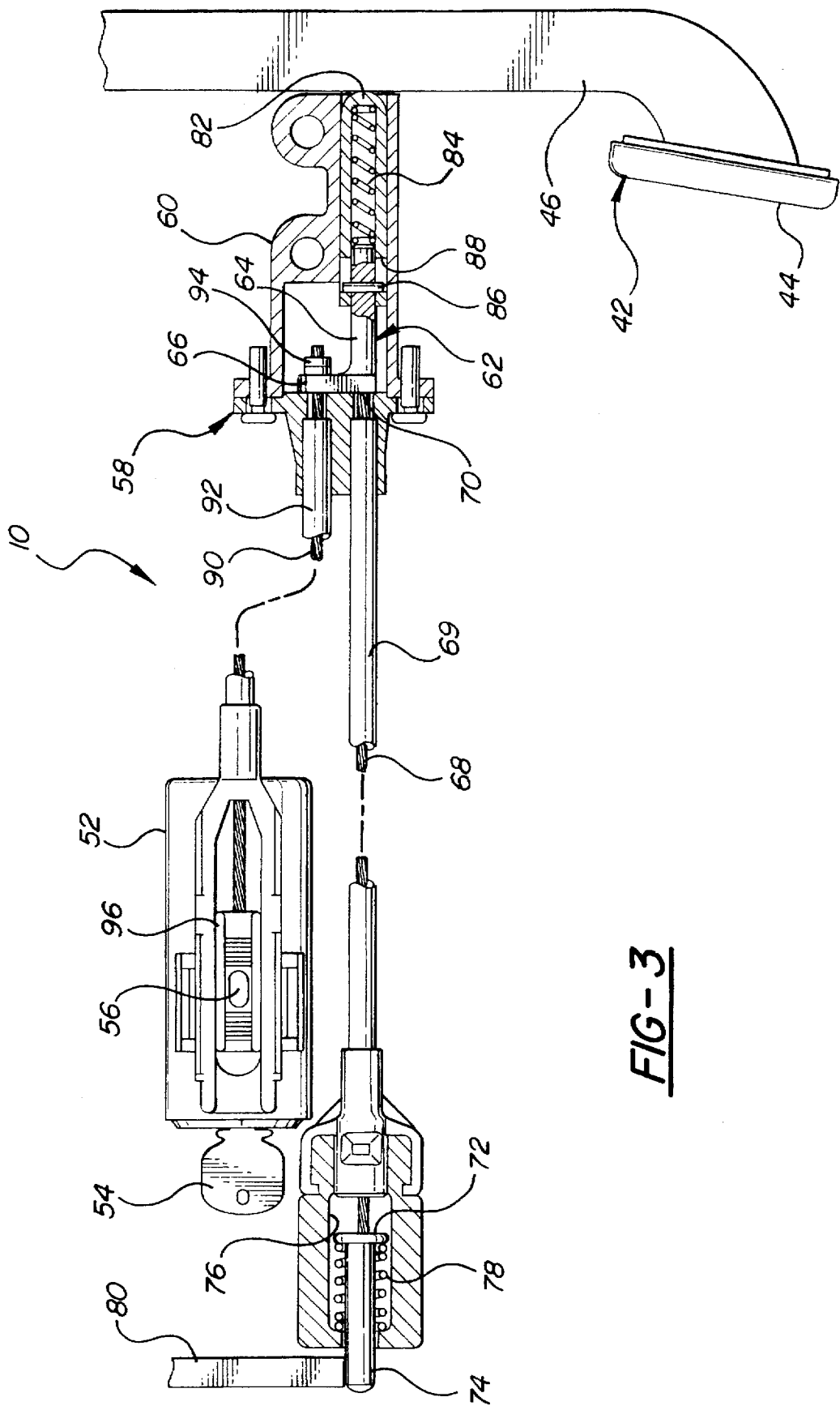
FIG. 3 is a schematic view showing the subject interlock assembly operatively disposed between a brake pedal in the rest position and an ignition switch in the Off position and the lug of the column shift mechanism in the Park position.
Figure 4:
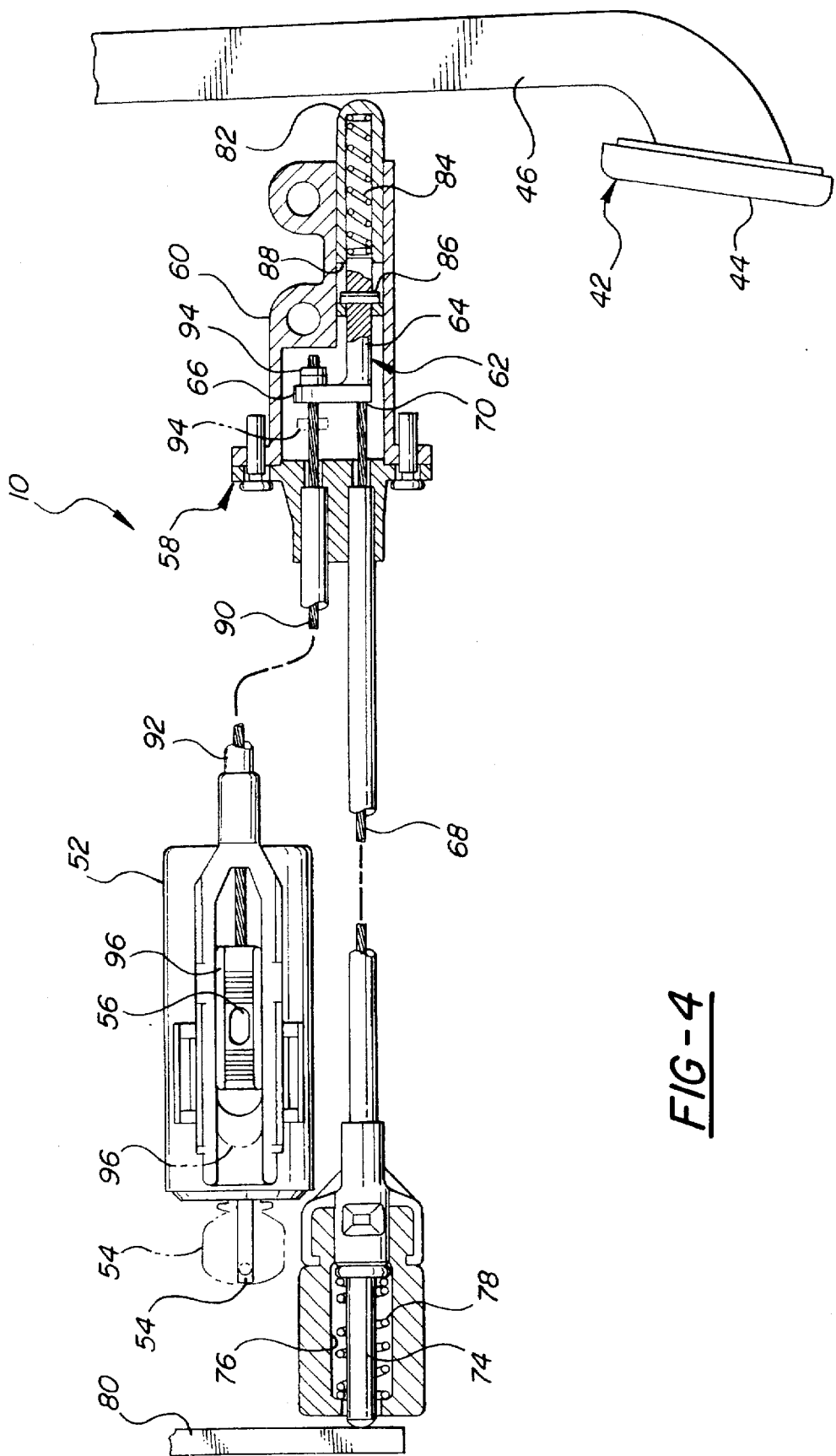
FIG. 4 is a schematic view as in FIG. 3 but showing the brake pedal in the actuated position and the ignition switch in the Run position and the lug of the column shift mechanism in the Drive position.

The ignition system of the automobile is controlled by a key operated ignition switch 52, as shown in FIGS. 1 and 3-4. A typical key 54 is inserted into the lock cylinder portion of the ignition switch 52 and rotated to move the ignition switch 52 between Off and Run positions for selectively energizing an ignition system. The ignition switch 52 includes a lug 56 which is axially displaced along the exterior of the ignition switch housing as the ignition switch 52 is moved between the Off and Run positions.

The subject invention includes an interlock, generally indicated at 58, for initially restraining the gear selector lever 12 in the Park position until the brake pedal 42 is moved to the applied position. This is done as a safety measure to make certain that the hydraulic braking system is pressurized and restraining the automobile in a stopped condition when the transmission is engaged in a drive gear. The interlock 58 includes a housing 60 affixed inside the passenger compartment of the automobile in an under-dash position adjacent the brake pedal 42. A pedal actuator 62 is slidably disposed inside the housing 60, and reciprocates in response to movements of the brake pedal 42. That is, as the brake pedal 42 swings between its rest and applied positions, the pedal actuator 62 slides in the housing 60.

The pedal actuator 62 comprises an L-shaped plate having an elongated distal arm 64 and a truncated side arm 66. The distal arm 64 is preferably cylindrical. A flexible motion transmitting shifter cable 68 is slidably supported in a protective conduit 69, and includes opposite ends 70, 72 extending from the conduit 69. One end 70 of the shifter cable 68 operatively connects to the pedal actuator 62, generally aligned with the axis of the distal arm 64, while the other the end 72 operatively engages the gear selector lever 12. More particularly, a rigid inhibitor pin 74 extends from the end 72 of the shifter cable 68. The inhibitor pin 74 is slidably disposed in a chamber 76 adjacent the shifter housing 26. A relatively light compression retractor spring 78 is also disposed in the chamber 76 and bears against a flange on the inhibitor pin 74 for biasing the inhibitor pin 74 and the attached shifter cable 68 and pedal actuator 62. The inhibitor pin 74 is selectively engagable with an ear 80 on the yoke 18 of the gear selector lever 12 for barricading the gear selector lever 12 in the Park position. That is, when the gear selector lever 12 is in the Park position, as shown in FIGS. 2 and 3, the ear 80 does not cover the inhibitor pin 74, such that it extends fully from its chamber 76. However, if the gear selector lever 12 were attempted to be rotated from the Park position, the ear 80 would collide in a shearing manner with the inhibitor pin 74 thus blocking the path.

The pedal actuator 62 also includes a compressible tip 82 for yielding in response to a force applied by the brake pedal 42. The compressible tip 82 will yield, or compress over the distal arm 64 whenever the ignition switch is in the Run position and the gear selector lever 12 is in the Park position, and then brake pedal 42 returns to its rest position. This condition is best shown in FIG. 4, where the ear 80 covers the inhibitor pin 74 and holds it in the compressed condition illustrated. This in turn advances the pedal actuator 62 within its housing 60, so that the compressible tip 82 extends from the housing 60 in position to be struck by the arm 46 of the brake pedal 42. However, as the brake pedal 42 returns to the rest, or unactuated rest, position (FIG. 3), its pedal arm 46 will strike and compress the compressible tip 82 in telescoping fashion over the distal arm 64. The compressible tip 82 feature allows the interlock 58 to be packaged very compactly under the dash board of the vehicle. Therefore, the housing 60 can be smaller, thereby increasing the available mounting and positioning opportunities. Also, the compact housing 60 and interlock 58 arrangement permits other adjacent components to be more freely located in the passenger compartment under the dashboard. Further, a significant weight reduction and materials savings can be realized considering the high volumes typically associated with automotive products.

The compressible tip 82 has a crowned exterior end which contacts the pedal arm 46 and closes that one end so that a spring 84 disposed therein is trapped against the distal arm 64. A lost motion connection is disposed between the compressible tip 82 and the distal arm 64. The lost motion connection comprises a cross pin 86 pressed through the end of the distal arm 64. The extending ends of the cross pin 86 are captured in diametrically opposed slots 88 which limit the axial travel of the compressible tip 82 relative to the distal arm 64.

The interlock 58 preferably also includes a flexible motion transmitting ignition cable 90 extending between the ignition switch 52 and the side arm 66 of the pedal actuator 62. The ignition cable 90 is slidably disposed in a protective conduit sheath 92. One end of the ignition cable 90 extends freely through a hole in the side arm 66, with a slug 94 affixed to provide a stop. At the opposite end of the ignition cable 90, a terminal 96 engages the lug 56 on the ignition switch 52 so that as the key 54 is moved from the Off to the Run position, the lug 56 is displaced axially a short distance, forcing the ignition cable 90 to also move to the right as viewed from FIGS. 3 and 4.

The ignition cable 90 prevents movement of the gear selector lever 12 from the Park position if the ignition switch is not in the Run position. Conversely, this feature also prevents the ignition switch 52 from being moved to the Off position from the Run position if the gear selector lever 12 is not first in the Park position. This is accomplished by the position of the pedal actuator 62. When the pedal actuator 62 is in the left most position shown in solid lines in FIG. 3, which results from the ignition switch 52 being in the Off position and/or the brake pedal 42 in the unactuated rest position, the inhibitor pin 74 cannot be retracted which means that the gear selector lever 12 is "locked" in the Park position. However, when the pedal actuator 62 is in the right most position shown in FIG. 4, the ignition switch 52 is "locked" in the Run position (via restraint caused by abutment of the slug 94 against the side arm 66) until the gear selector lever 12 is moved back to the Park position, which permits extension of the inhibitor pin 74 and movement of the pedal actuator 62 back to the left most position shown in solid lines in FIG. 3.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A cable operated brake/transmission interlock assembly (10) for an automobile having a braking system and an automatic transmission, said assembly (10) comprising: a gear selector lever (12) moveable between a Park position and a plurality of drive positions for remotely controlling an automatic transmission of an automobile; a brake pedal (42) moveable between rest and applied positions for remotely controlling a braking system of the automobile; an interlock (58) for initially restraining said gear selector lever (12) in said Park position until said brake pedal (42) is moved to said applied position; said interlock (58) including a pedal housing (60) and a pedal actuator (62) reciprocally supported in said pedal housing (60) and responsive to movements of said brake pedal (42); said interlock (58) including a flexible motion transmitting shifter cable (68) extending between opposite ends (70, 72), one of said ends (70, 72) operatively connected to said pedal actuator (62) and the other of said ends (70, 72) operatively engagable with said gear selector lever (12); characterized by said pedal actuator (62) including a deflectable tip (82) extensible from said pedal housing (60) for yielding through lost motion in response to a compressive force applied thereto by said brake pedal (42) returning to said rest position in the event said pedal actuator (62) remains stationary due to said gear selector lever (12) residing in one of said drive positions, whereby said pedal housing (60) can be packaged in a small unit area.

2. An assembly (10) as set forth in claim 1 further including a spring (84) disposed between said pedal actuator (62) and said tip.

3. An assembly (10) as set forth in claim 2 wherein said pedal actuator (62) comprises an L-shaped plate having an elongated distal arm (64) and a truncated side arm (66).

4. An assembly (10) as set forth in claim 3 wherein said compressible tip (82) is telescopically disposed about said distal arm (64) of said pedal actuator (62) with said spring (84) disposed therebetween.

5. An assembly (10) as set forth in claim 3 further including a lost motion connection disposed between said compressible tip (82) and said distal end of said pedal actuator (62).

6. An assembly (10) as set forth in claim 5 wherein said compressible tip (82) has a generally tubular construction with a cylindrical receptacle, said distal arm (64) of said pedal actuator (62) having a generally cylindrical exterior matingly received in said receptacle of said compressible tip (82).

7. An assembly (10) as set forth in claim 6 wherein said compressible tip (82) includes opposing slots (88) and said distal arm (64) includes a cross-pin (86) extending transversely through said slots (88).

8. An assembly (10) as set forth in claim 3 wherein said shifter cable (68) includes a rigid inhibitor pin (74) selectively engagable with said gear selector lever (12).

9. An assembly (10) as set forth in claim 8 further including a retractor spring (78) operatively biasing said inhibitor pin (74) and said shifter cable (68) into compression.

10. An assembly (10) as set forth in claim 3 further including an ignition switch (52) moveable between Off and Run positions for selectively energizing an ignition system of the automobile.

11. An assembly (10) as set forth in claim 10 wherein said ignition switch (52) includes a lug (56) which is axially displaced as said ignition switch (52) is moved between said Off and Run positions.

12. An assembly (10) as set forth in claim 11 wherein said interlock (58) includes a flexible motion transmitting ignition cable (90) extending between said ignition switch (52) and said side arm (66) of said pedal actuator (62).

13. An assembly (10) as set forth in claim 12 wherein said ignition cable (90) is slidably disposed through a hole in said side arm (66), with a slug (94) affixed to said ignition cable (90).

14. An assembly (10) as set forth in claim 13 wherein said ignition cable (90) includes a terminal (96) engagable with said lug (56).

15. A cable operated brake/ignition/transmission interlock assembly (10) for an automobile having a braking system, an ignition system and an automatic transmission, said assembly (10) comprising: a gear selector lever (12) moveable between a Park position and a plurality of drive positions for remotely controlling an automatic transmission of an automobile; a brake pedal (42) moveable between rest and applied positions for remotely controlling a braking system of the automobile; an ignition switch (52) moveable between Off and Run positions for selectively energizing an ignition system of the automobile; an interlock (58) for preventing movement of said gear selector lever (12) from said Park position until said ignition switch (52) is in said Run position and said brake pedal (42) is in said applied position; said interlock (58) including a pedal housing (60) and a pedal actuator (62) moveably disposed in said pedal housing (60) and responsive to movements of said brake pedal (42); characterized by said pedal actuator (62) including a compressible tip (82) for yielding in response to a force applied by said brake pedal (42) returning to said rest position in the event said pedal actuator (62) remains stationary due to said gear selector lever (12) residing in one of said drive positions, whereby said interlock (58) can be packaged in a small unit area.

* * * * *